United States Patent [19]
Chen et al.

[11] Patent Number: 6,061,796
[45] Date of Patent: May 9, 2000

[54] MULTI-ACCESS VIRTUAL PRIVATE NETWORK

[75] Inventors: James F. Chen, Potomac; Jieh-Shan Wang, N. Potomac; Christopher T. Brook, Chevy Chase, all of Md.; Francis Garvey, Arlington, Va.

[73] Assignee: V-One Corporation, Germantown, Md.

[21] Appl. No.: 08/917,341

[22] Filed: Aug. 26, 1997

[51] Int. Cl.$^7$ .......................... G06F 13/00; G06F 15/163; H04K 1/00; H04L 9/00

[52] U.S. Cl. .............................. 713/201; 380/25; 380/49; 709/225

[58] Field of Search .............................. 395/187.01, 186, 395/188.01, 200.49, 200.47, 200.48, 200.55; 380/21, 49, 25, 4, 23; 709/217, 218, 219, 225; 713/201

[56] References Cited

U.S. PATENT DOCUMENTS

| | | | |
|---|---|---|---|
| 5,491,800 | 2/1996 | Goldsmith et al. | 395/200.12 |
| 5,550,984 | 8/1996 | Gelb | 395/187.01 |
| 5,602,918 | 2/1997 | Chen et al. | 380/21 |
| 5,657,390 | 8/1997 | Elgamal et al. | 380/49 |
| 5,724,355 | 3/1998 | Bruno et al. | 370/401 |
| 5,790,800 | 8/1998 | Gauvin et al. | 395/200.57 |
| 5,802,304 | 9/1998 | Stone | 395/200.57 |

OTHER PUBLICATIONS

Hurwicz, "A Virtual Private Affair", Byte Magazine, pp. 79–87, Jul. 1997.

Thomas Stark, "Protecting Your Link to the Net," LAN Times, Jun. 17, 1996.

Charles Hedrick, "What is TCP/IP," Introduction to the Internet Protocols, 1987.

Stardust Technologies, Inc., "Windows Sockets—Where Necessity is the Mother of Invention," 1996.

M. Leech et al, RFC 1928, Mar. 1996.

Aziz et al., "Simple Key–Management for Internet Protocols (SKIP)," date unknown.

Joe Paone, "Clash Over VPN Supremacy," LAN Times, Sep. 30, 1996.

Snare Networks Corporation Internet Brochure, 1997.

Microsoft, "Point–To–Point Tunneling Protocol (PPTP) Frequently Asked Questions," 1997.

Smartsec (Sweden), "The Development of Network Security Technologies," Feb. 1997.

Isle, Winsocks and Undefined Dynalink, Al's Winsock Tuning FAQ, 1995.

*Primary Examiner*—Norman Michael Wright
*Attorney, Agent, or Firm*—Bacon & Thomas, PLLC

[57] ABSTRACT

A virtual private network for communicating between a server and clients over an open network uses an applications level encryption and mutual authentication program and at least one shim positioned above either the socket, transport driver interface, or network interface layers of a client computer to intercept function calls, requests for service, or data packets in order to communicate with the server and authenticate the parties to a communication and enable the parties to the communication to establish a common session key. Where the parties to the communication are peer-to-peer applications, the intercepted function calls, requests for service, or data packets include the destination address of the peer application, which is supplied to the server so that the server can authenticate the peer and enable the peer to decrypt further direct peer-to-peer communications.

28 Claims, 7 Drawing Sheets

MULTI-ACCESS VIRTUAL PRIVATE NETWORK

BACKGROUND OF THE INVENTION

1. Field of the Invention

This invention relates a system and method for allowing private communications over an open network, and in particular to a virtual private network which provides data encryption and mutual authentication services for both client/server and peer-to-peer applications at the applications, transport driver, and network driver levels.

2. Discussion of Related Art

A virtual private network (VPN) is a system for securing communications between computers over an open network such as the Internet. By securing communications between the computers, the computers are linked together as if they were on a private local area network (LAN), effectively extending the reach of the network to remote sites without the infrastructure costs of constructing a private network. As a result, physically separate LANs can work together as if they were a single LAN, remote computers can be temporarily connected to the LAN for communications with mobile workers or telecommuting, and electronic commerce can be carried out without the risks inherent in using an open network.

Figure 1A:
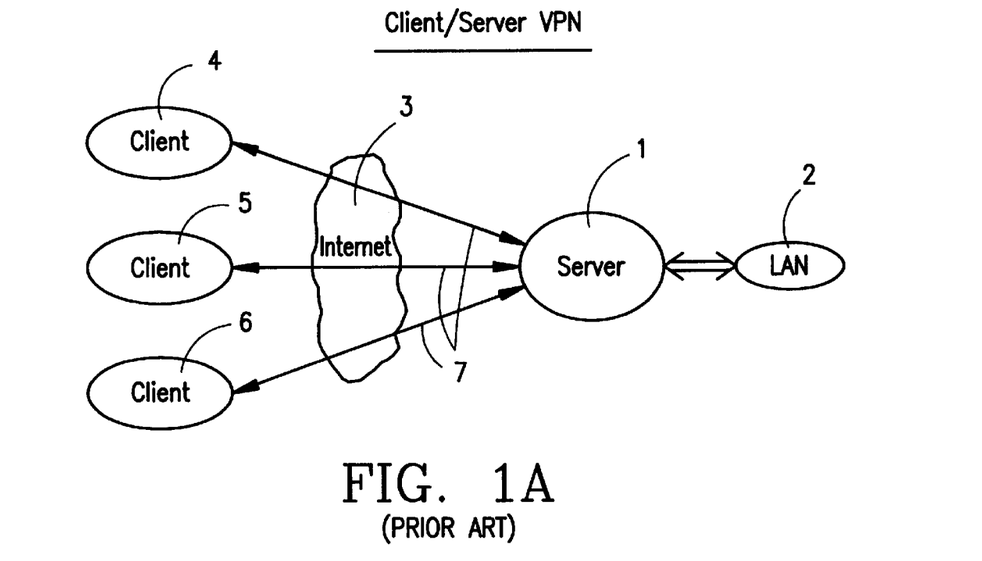
FIG. 1A is a schematic diagram of a client/server virtual private network.
Figure 1B:
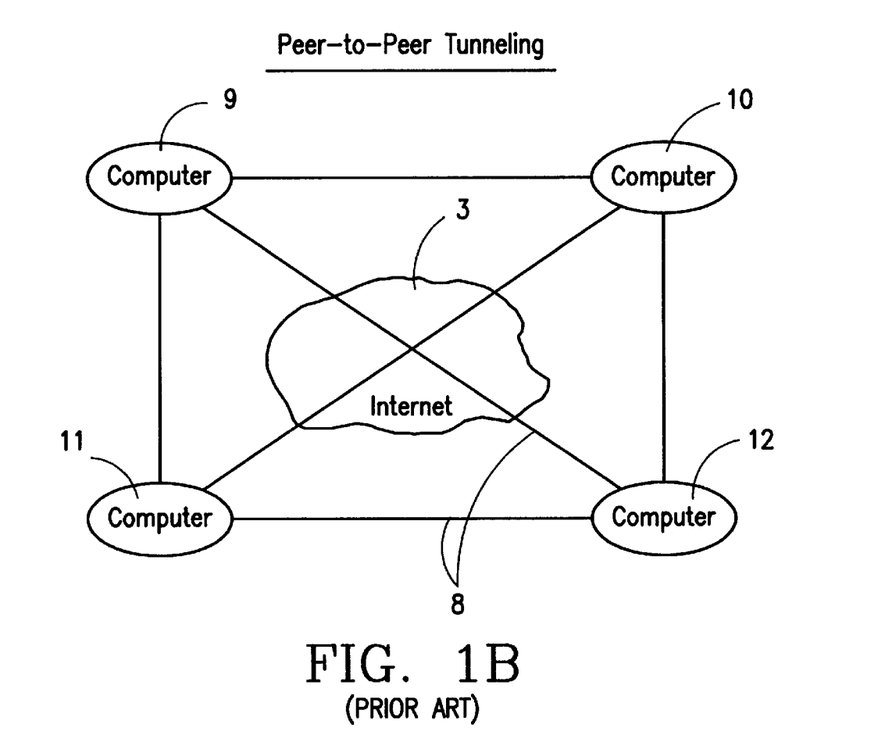
FIG. 1B is a schematic diagram of an alternative virtual private network based on peer-to-peer communications.

In general, there are two approaches to virtual private networking, illustrated in FIGS. 1A and 1B. The first is to use a dedicated server 1, which may also function as a gateway to a secured network 2, to provide encryption and authentication services for establishment of secured links 3 between the server 1 and multiple clients 4–6 over the open network 7, represented in FIG. 1A as a cloud, while the second is to permit private communications links 8 to be established between any two computers or computer systems 9–12 on network 7, as illustrated in FIG. 1B.

The advantages of a client/server arrangement such as the one shown in FIG. 1A are that the server can handle functions requiring the majority of the computing resources, increasing the number of potential clients, and that management of the network, including key management is centralized. The disadvantage of a client/server network of this type is that peer-to-peer communications links between applications on the client computers cannot utilize the security and management functions provided by the server, leaving such communications unprotected. On the other hand, the advantage of the direct peer-to-peer approach illustrated in FIG. 1B is that it permits secured links to be established between any computers capable of carrying out the required security functions, with the disadvantages being the cost of configuring each computer to carry-out encryption, authentication, and key management functions, and the lack of central control.

In both the client/server and peer-to-peer approaches, a virtual private network can in theory be based either on applications level technology or can operate at a lower level. Generally, however, peer-to-peer "tunneling" arrangements require modification of the lower layers of a computer's communications architecture, while client/server arrangements can use the applications level approach because less modification of the clients is required, and thus the two approaches are in practice mutually exclusive. The present invention, on the other hand, seeks to provide a virtual private network which utilizes a client/server approach, including centralized control of encryption, authentication, and key management functions, while at the same time enabling secured peer-to-peer communications between applications, by utilizing the server to provide authentication and session key generation functions for both client to server communications and peer-to-peer communications, providing a virtual private network capable of serving both as an extended intranet or wide area network (WAN), and as a commercial mass marketing network, with high level mutual authentication and encryption provided for all communications.

In order to completely integrate the two approaches and maximize the advantage of each approach, the invention maintains the applications level infrastructure of prior client server private networking arrangements, while adding shims to lower levels in order to accommodate a variety of peer-to-peer communications applications while utilizing the applications level infrastructure for authentication and session key generation purposes. This results in the synergistic effect that not only are existing peer-to-peer tunneling schemes and applications level client server security arrangements combined, but they are combined in a way which greatly reduces implementation costs In order to understand the present invention, it is necessary to understand a few basic concepts about computer to computer communications, including the concepts of "layers" and communications protocols, and of mutual authentication and file encryption. Further information about layers and protocols can be found in numerous sources available on the Internet, a few of which are listed at the end of this section, while a detailed description of a mutual authentication and encryption system and method suitable for use in connection with the present invention can be found in U.S. Pat. No. 5,602,918, which is incorporated herein by reference. In general, the basic communications protocols and architecture used by the present invention, as well as authentication, encryption, and key management schemes, are already well-known, and can be implemented as a matter of routine programming once the basic nature of the invention is understood. The changes made by the present invention to the conventional client server virtual private network may be thought of as, essentially, the addition of means, most conveniently implemented as shims, which add a secured mutual authentication and session key generation channel between the server and all parties to a communication, at all levels at which a communication can be carried out.

Having explained the key differences between the present invention and existing systems, the basic concepts of layers and so forth will now be briefly explained by way of background. First, the concept of "layers," "tiers," and "levels," which essential to an understanding of the invention, simply refers to libraries or sets of software routines for carrying out a group of related functions, and which can conveniently be shared or called on by different programs at a higher level to facilitate programming, avoiding duplication and maximizing computer resources. For example, the Windows NT device driver architecture is made up of three basic layers, the first of which is the Network Driver Interface Specification (NDIS 3.0) layer, the second of which is called the Transport Driver Interface (TDI) layer, and the third being the file systems. These layers are generically referred to as the network driver layer, the transport or transport driver layer, and the applications layer.

In the Windows NT architecture, the TDI layer formats data received from the various file systems or applications into packets or datagrams for transmission to a selected destination over the open network, while the NDIS layer controls the device drivers that send the data, packets, or IP datagrams, for example by converting the stream of data into a waveform suitable for transmission over a telephone line or a twisted pair cable of the type known as an Ethernet.

By providing layers in this manner, an applications software programmer can design an application program to supply data to the TDI layer without having to re-program any of the specific functions carried out by that layer, and all of the transmission, verification, and other functions required to send a message will be taken care of the TDI layer without further involvement by the applications software. In a sense, each "layer" simply accepts data from the higher layer and formats it by adding a header or converting the data in a manner which is content independent, with retrieval of the data simply involving reverse conversion or stripping of the headers, the receiving software receiving the data as if the intervening layers did not exist.

In the case of Internet communications, the most commonly used set of software routines for the transport or TDI layer, which takes care of the data formatting and addressing, is the TCP/IP protocol, in which the transport control protocol (TCP) packages the data into datagrams and provides addressing, acknowledgements, and checksum functions, and the internet protocol (IP) further packages the TCP datagrams into packets by adding additional headers used in routing the packets to a destination address. Other transport protocols which can be included in the TDI layer include the user diagram protocol (UDP), the internet control message protocol (ICMP), and non-IP based protocols such as Netbeui or IPX.

Additional "protocols" are may be used at the applications level, although these protocols have nothing to do with the present invention except that they may be included in the applications programs served by the network. Common applications level protocols which utilize the TCP/IP protocol include hypertext transfer protocol (HTTP), simple mail transfer protocol (SMTP), and file transfer protocol (FTP), all of which operate at the layer above the transport layer.

Some applications are written to directly call upon the TCP functions. However, for most applications utilizing a graphical user interface conveniently rely on a set of software routines which are considered to operate above the TDI layer, and are known as sockets. Sockets serve as an interface between the TCP set of functions, or stack, and various applications, by providing libraries of routines which facilitate TCP function calls, so that the application simply has to refer to the socket library in order to carry out the appropriate function calls. For Windows applications, a commonly used non-proprietary socket is the Windows socket, known as Winsock, although sockets exist for other operating systems or platforms, and alternative sockets are also available for Windows, including the Winsock 2 socket currently under development.

In order to implement a virtual private network, the encryption and authentication functions must be carried out at one of the above "levels," for example by modifying the network drivers to encrypt the IP datagrams, by inserting authentication headers into the TCP/IP stacks, or by writing applications to perform these functions using the existing drivers. If possible, it is generally desirable to minimize modification of the existing levels by adding a layer to perform the desired functions, calling upon the services of the layer below, while utilizing the same function calls so that the higher layer also does not need to be modified. Such a layer is commonly referred to as a "shim."

As indicated above, the preferred approach to implementing client/server virtual private networks is to use an applications level security system to encrypt files to be transmitted, and to then utilize existing communications layers such as Winsock, or TCP/IP directly. This is the approach taken by the commercially available access control system known as SmartGATE™, developed by V-One Corp. of Germantown, Md., which provides both encryption and mutual authentication at the applications level utilizing a dedicated server known as an authentication server and authentication client software installed at the applications level on the client computers. A description of the manner in which encryption and mutual authentication is carried out may be found in the above-cited U.S. Pat. No. 5,602,918. While the principles of the invention are applicable to other client/server based virtual private networks, SmartGATE™ is used as an example because it provides the most complete range of mutual authentication and encryption services currently available.

The present invention can be implemented using the existing SmartGATE™ system, but adds mutual authentication and encryption services to lower layers by intercepting function calls or data packets and, during initialization of a communications link, establishing separate channels between the party initiating the communication and the authentication server, and between the authentication server and the party which is to share in the communication, so as to mutually authenticate the parties with respect to the server, and so as to establish a session key which can be used for further direct communications between the parties.

A number of protocols exist which can be used, in total or in part, to implement the mutual authentication and encryption services at the lower layers, using the same basic authentication and encryption scheme currently implemented by SmartGATE™ at the applications level. These include, by way of example, the SOCKS protocol, which places a shim between the TDI or transport layer and the applications, and the commercially available program, known as SnareNet, which operates at the network driver level and can be directly utilized in connection with the present invention.

On the other hand, a network level implementation such as the SKIP protocol, which operates below the TDI layer to encrypt the datagrams, and which in its description explicitly precludes the generation of session keys (see the above cited U.S. Pat. No. 5,602,918), is fundamentally different in concept than the present invention. Similarly, alternative implementations such as Point-to-Point Tunneling Protocol (PPTP) which involve modifying the TCP/IP stack and/or hardware to provide encryption, as opposed to inserting shims, are not utilized by the preferred embodiment of the present invention, although individual aspects of the protocol could perhaps be used, and the present system could be added to computers also configured to accept PPTP communications.

The SmartGATE™ system uses public key and DES encryption to provide two-way authentication and 56-bit encrypted communications between a server equipped with the SmartGATE program and client computers equipped with a separate program. Currently, SmartGATE™ operates at the highest level, or applications level, by using shared secret keys to generate a session key for use in further communications between the authentication server or gateway and the client program. Since the session key depends on the secret keys at the gateway and client sides of the communication, mutual authentication is established during generation of the session key, which can then be used to encrypt further communications.

When installed on a client system, the SmartGATE™ client software reads a request for communications by an applications program, such as a browser program, and then proceeds to establish its own communications link with the destination server to determine if the server is an authentication server. If it is not, control of communications is relinquished, but if it is, then the security program and the server carry out a challenge/response routine in order to generate the session key, and all further communications are encrypted by the security program. Although this program is placed between the Winsock layer and the applications, it does not function as a shim, however, because it only affects communications directed to the authentication server.

Having briefly summarized the concepts used by the present invention, including the concepts of layers, protocols, and shims, and having described a specific applications level security program which is to be modified according to the present invention by adding shims in a way which enables secured authentication and session key generation channels to be set up from the lower layers, it should now be possible to understand the nature of the invention, and in particular how it integrates the two approaches to virtual private networking in a way which greatly expands the concept and yet can easily be implemented. More details will be given below, but as a final observation in this background portion of the patent specification, it should be noted that while the overall concept of the invention is in a sense very simple, it is fundamentally at odds with present approaches. For example, the literature is replete with references to conflicts between VPN standards and implementations, as exemplified by the title of an article from LAN Times On-Line, September 1996, (http://www.wcmh.com/), which reads *Clash Over VPN Supremacy*. Even a cursory search of the available literature indicates that the amount of information and choices available to those wishing to set up a virtual private network is overwhelming. One can choose between Netscape Communications Secure Socket Layer, Open Market Inc.'s Secure HTTP, Microsoft's PPTP, among others. However, all of these approaches operate at a single level, and force a choice between establishing a network of the type shown in FIG. 1A and a network of the type shown in FIG. 1B. Only the present invention offer the advantages of both approaches, without the inflexibility of client/server arrangements or the costs of more distributed architectures.

For further information on the various competing VPN protocols and systems, see also *The Development of Network Security Technologies*, Internet Smartsec, February 1997 (http://www.smartsec.se), which compares Smart-GATE™ to other application level security systems, including PPTP, SSL, and S-HTTP; *Point-To-Point Tunneling Protocol (PPTP) Frequently Asked Questions*, Microsoft Corp., date unknown, (http://www.microsoft.com), *Simple Key-Management for Internet Protocols (SKIP)*, Aziz et al., date unknown, (http://skip.incog.com), and *SOCKS Protocol Version 5, RFC* 1928, Leech et al., March 1996 (http://andrew2.andrew.cmu.edu) (this document describes a protocol involving a TDI shim). For more general information on security problems, Internet protocols, and sockets, see *Introduction to the Internet Protocols*, Charles L. Hedrick, Rutgers University, 1987 (http://oac3.hsc.uth.tmc.edu); *Windows Sockets—Where Necessity is the Mother of Reinvention*, Stardust Technologies, Inc., 1996, (http//www.stardust.com), and *Secure Internet Connections*, LAN Times, June 17, 1996 (Ibid).

SUMMARY OF THE INVENTION

It is accordingly a principal objective of the invention to provide a client/server virtual private network which is capable not only of carrying out authenticated secure communications over an open network between an authentication server and clients, but also authenticated secure peer-to-peer communications.

It is also an objective the invention to provide a virtual private network that provides data encryption and mutual authentication for both client/server and peer-to-peer communications for different-types of applications, using both the applications level and lower levels of a communications hierarchy.

It is a further objective of the invention to provide a client/server virtual private network which can provide both client/server and peer-to-peer encryption and authentication services for any application sharing a specified socket or sockets, whether or not the application is recognized by the encryption and authentication program.

It is a still further objective of the invention to provide a client/server virtual private network which can provide encryption and authentication services at the applications level, transport driver interface level, and network interface level, without the need for modifying either the communication driver or network driver, or any sockets utilizing the communications driver interface.

It is yet another objective of the invention to provide a virtual private network which provides encryption and authentication services for peer-to-peer communications while maintaining centralized control of key distribution and management functions.

Finally, it is also an objective of the invention to provide a virtual private network which provides encryption and authentication services for peer-to-peer communications and in which registration is carried out by a central gateway server.

These objectives of the invention are accomplished by providing a virtual private network for communicating between a server and clients over an open network and in which the clients are equipped with an applications level encryption and mutual authentication program which includes at least one shim positioned above either the socket, transport driver interface, or network interface layers of a client computers communications hierarchy, and which intercepts function calls or data packets in order to authenticate the parties to the communication by establishing secured channels between the server and the parties to the communication, prior to establishment of the secured communications link between the parties, in order to carry out mutual authentication and session key generation functions.

More particularly, according to the principles of a preferred embodiment of the invention, client communications software is provided which, at the socket or transport driver interface levels, intercepts function calls to the socket or transport driver and directs calls to the authentication server in order to perform encryption and authentication routines, and at the network driver interface, performs encryption and authentication functions by intercepting the datagrams or data portions of the packets transmitted by the transport driver interface based on communications between the authentication server and the client. According to this aspect of the invention, a system of providing authentication and encryption services for the purpose of establishing a virtual private network includes a plurality of shims arranged to operate at different protocol levels in order to establish a common secure communications link to an authentication server.

In one especially preferred embodiment of the invention, the client software includes a Winsock shim arranged to intercept function calls to the Winsock library on a client machine and redirect initial communications through the authentication client software to the authentication server, so that any function calls to the Winsock library of programs are intercepted by the shim and carried out by the applications level security program. In this embodiment, the client authentication software substitutes its own function calls for the original function calls in order to establish a secured communications link to the authentication server over which such functions as mutual authentication between the client and server, indirect authentication of peer applications by the now trusted server, session key generation, are carried out, as well as ancillary functions such as on-line registration (OLR), utilizing the unmodified original Winsock library and TCP/IP communications stacks.

By inserting a shim at the Winsock level, an applications level client/server based security program such as SmartGATE™ can be used to provide secure communications for any application which utilizes the Winsock library. In addition, by including analogous shims at other levels, the invention can be used to secure virtually any communications application, including those which by-pass the TDI layer and communicate directly with the network driver level.

Instead of the current array of mutually exclusive alternative methods and systems of establishing secured communications over an open network, the invention thus provides a single integrated method and system capable of carrying out both client/server communications and peer-to-peer communications between a wide variety of communications applications regardless of whether the applications use a socket or even commonly accepted internet protocols, with complete mutual authentication and encryption of data files at all levels and between all parties to the network.

It will be appreciated that the term "virtual private network" is not to be taken as limiting, and that the principles of the invention can be applied to any remote access schemes which utilize the Internet or other relatively insecure networks to provide access for remote users, corporate intranets, and electronic commerce.

DETAILED DESCRIPTION OF THE PREFERRED EMBODIMENTS

Figure 2:
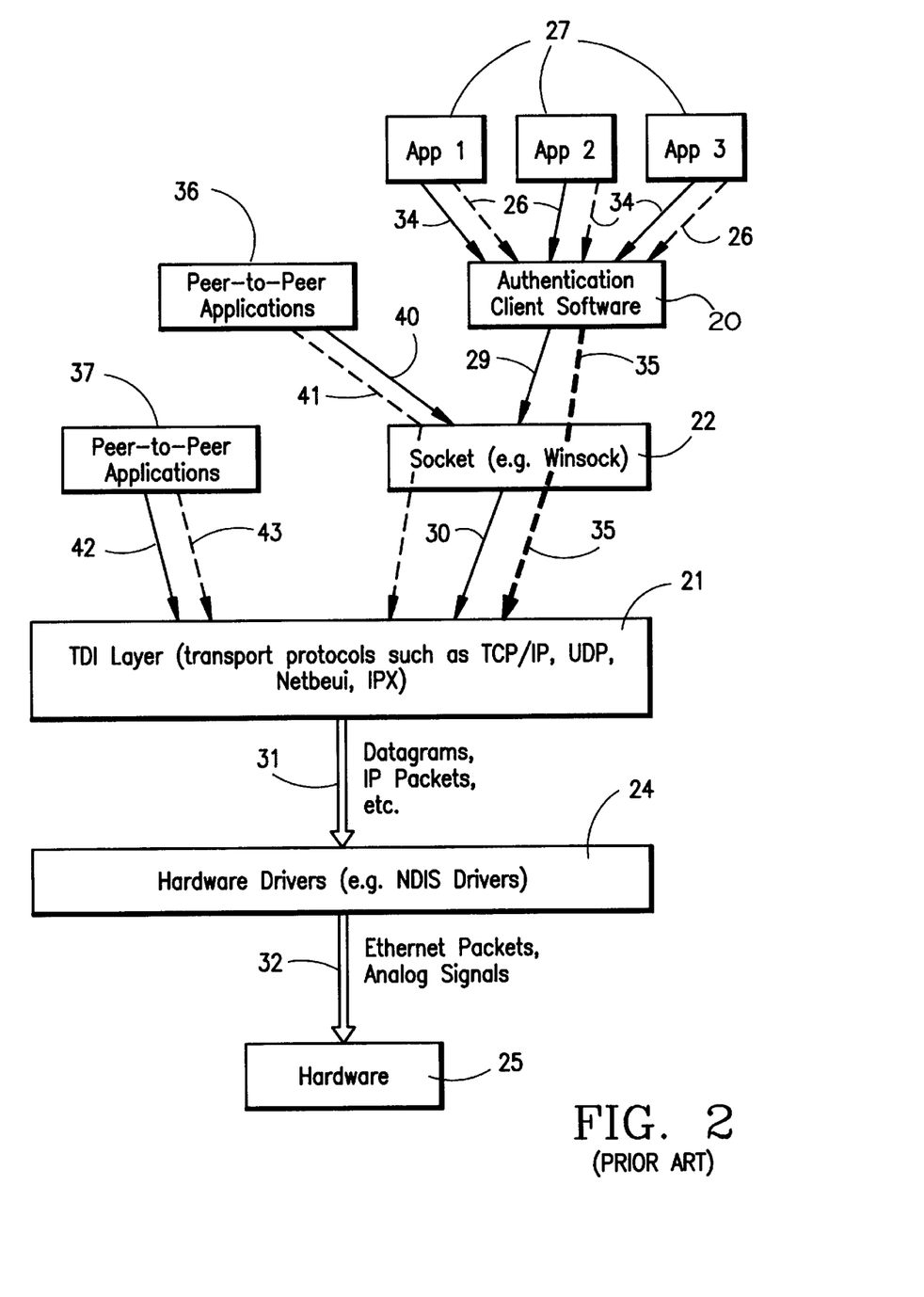
FIG. 2 is a functional block diagram showing the operation of an applications level security program in a conventional communications network hierarchy.

FIG. 2 illustrates the operation of a client authentication program which is utilized in the present invention. An example of such a program is the SmartGATE™ program discussed briefly above, although other applications level security programs, whether or not token based, could be modified in a manner similar to that discussed in the following description. The illustrated hierarchy is the Windows NT architecture, although versions of SmartGATE™ exist for other architectures, and the invention could easily be adapted for use with any version of SmartGATE™, including UNIX and MacIntosh versions, as well as for use with applications level security programs designed for communications architectures other than those supported by SmartGATE™. Conversely, it is intended that the present invention can be used with authentication and encryption schemes other than that used by SmartGATE™ and disclosed in U.S. Pat. No. 5,602,918. For purposes of convenience, therefore, the software represented by SmartGATE™ is simply referred to as client authentication software.

Figure 4:
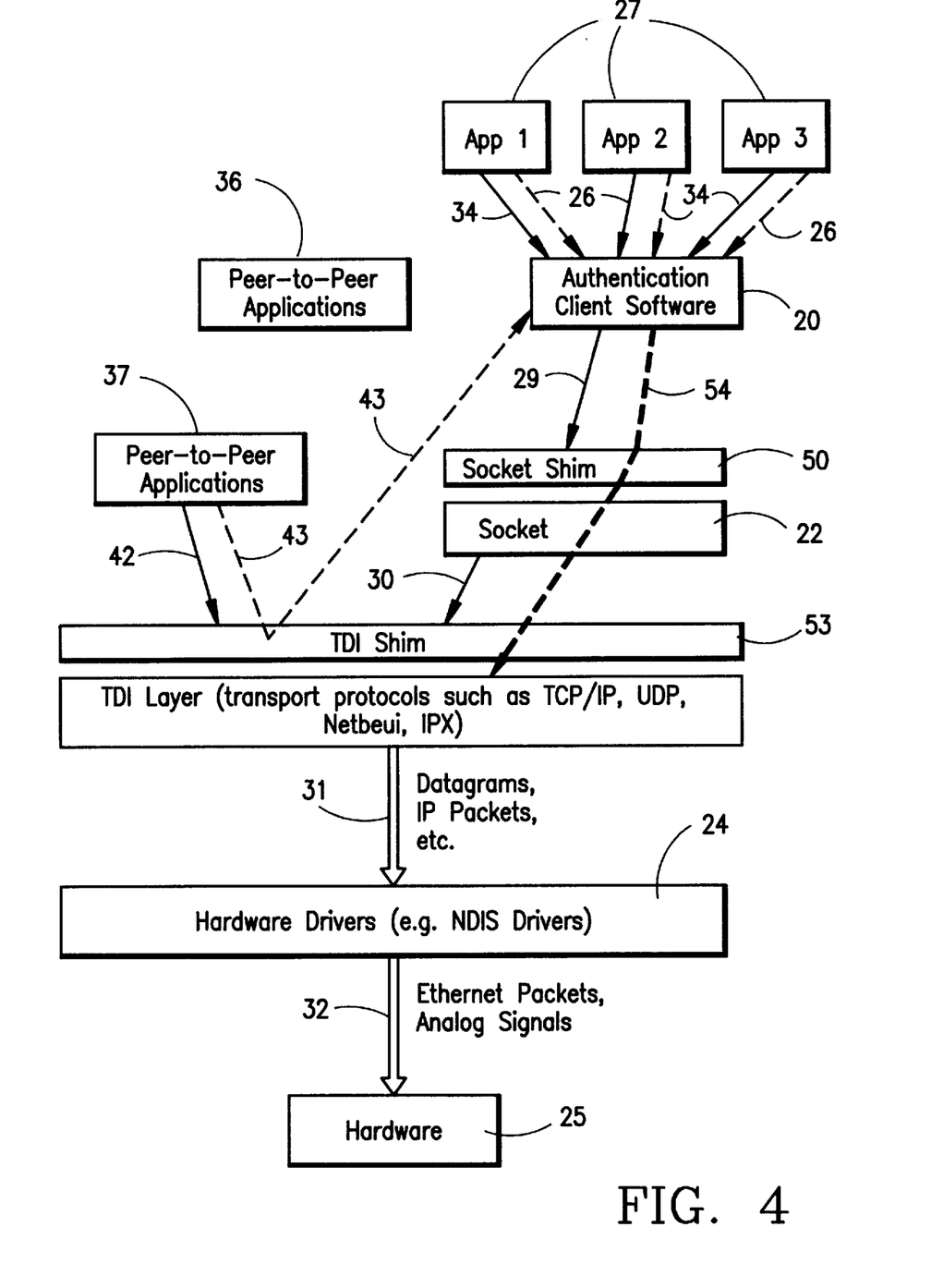
FIG. 4 is a functional block diagram showing the communications network hierarchy of FIG. 2, modified to provide a third layer of service in accordance with the principles of the preferred embodiment.
Figure 5:
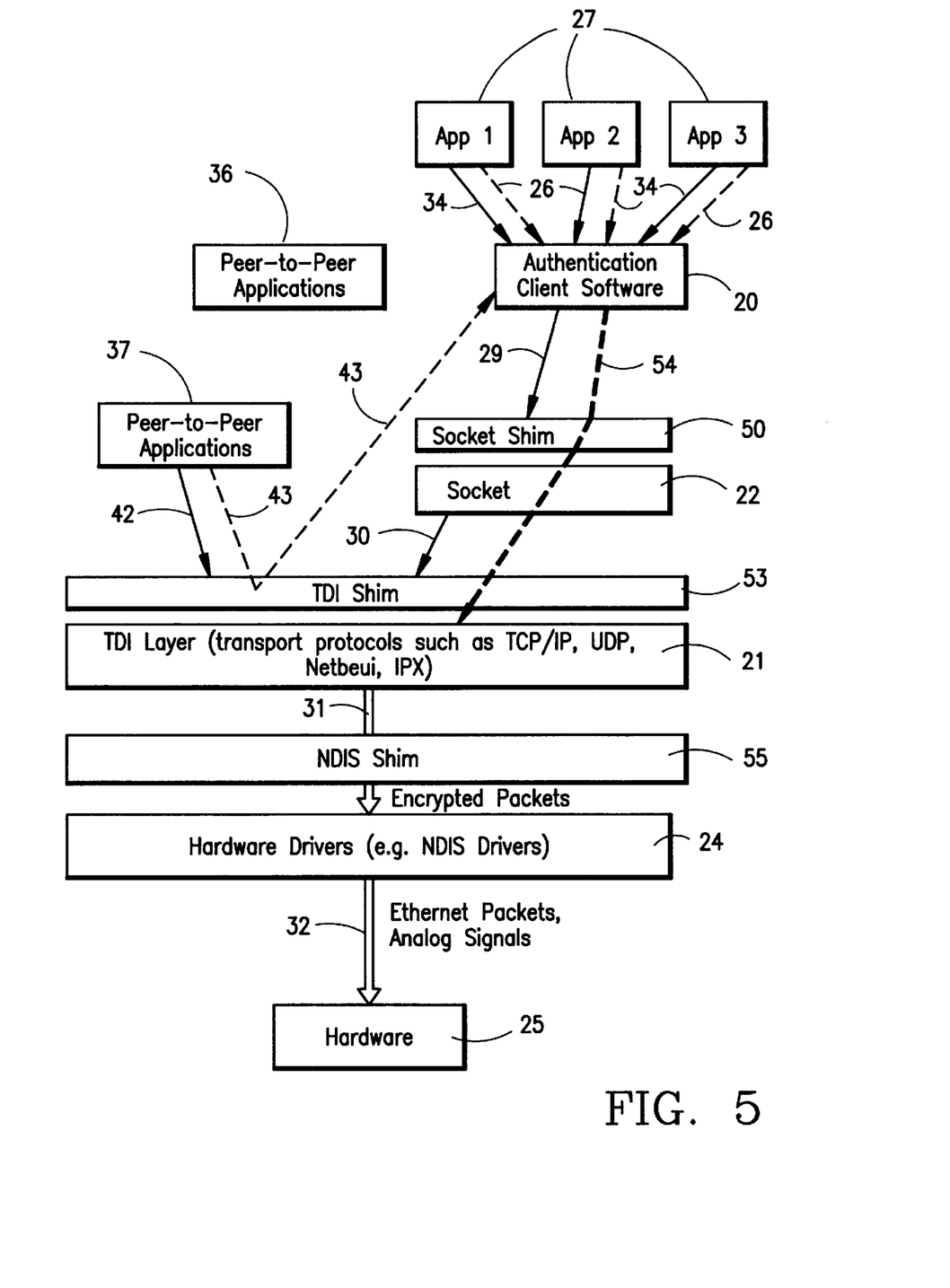
FIG. 5 is a functional block diagram showing the communication network hierarchy of FIG. 3, modified to provide a fourth layer of service in accordance with the principles of the preferred embodiment.
Figure 6:
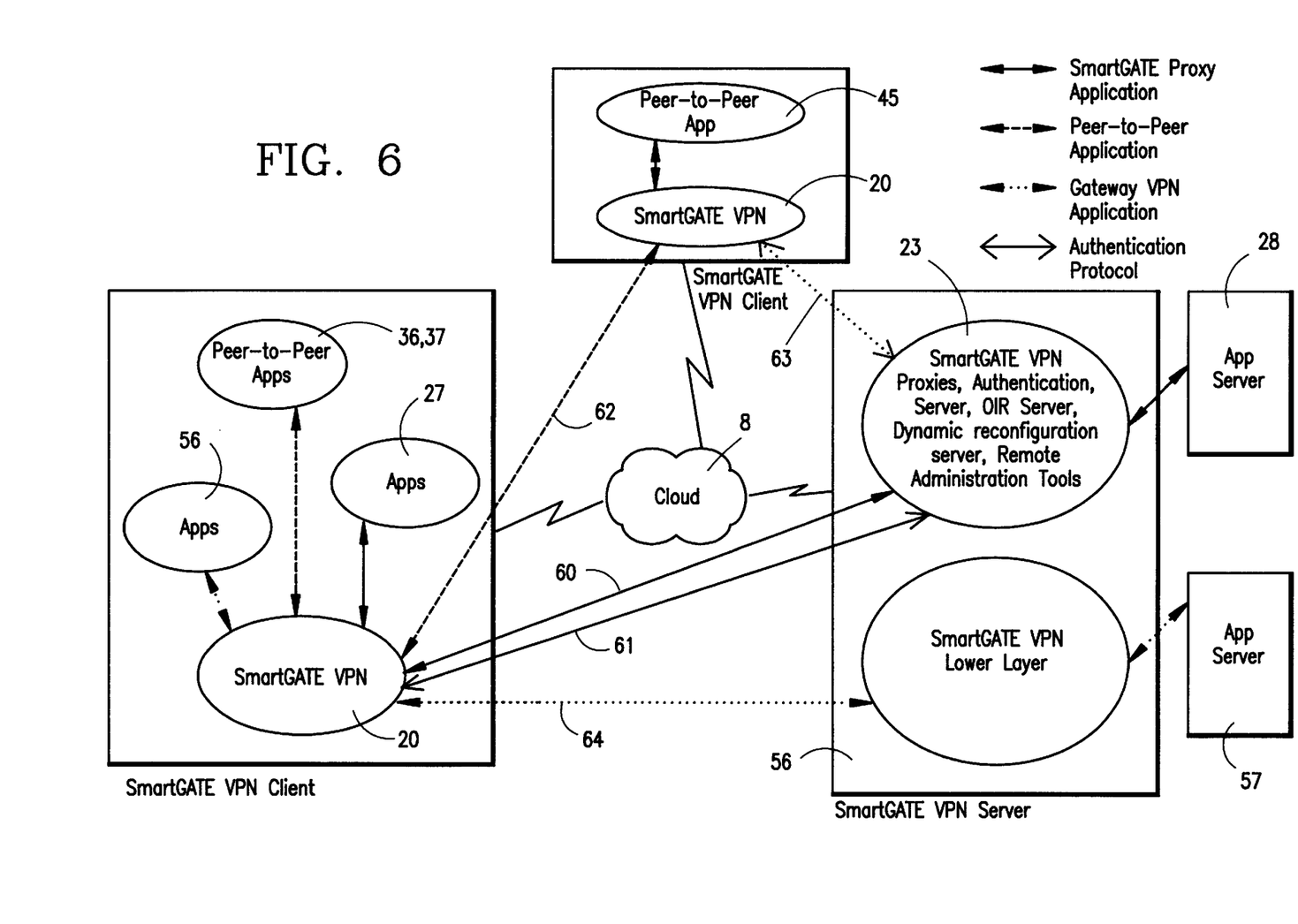
FIG. 6 is a schematic diagram of a virtual private network utilizing the principles of the preferred embodiment of the invention.

In addition, it noted that the client computer architectures illustrated in FIGS. 3–6, which are modified versions of the architecture of FIG. 2, is to be used with an overall network layout such as the one illustrated in FIG. 6, which includes an authentication server that may be a SmartGATE™ server, or another server depending on the client authentication software. The invention is not merely the addition of shims to the client software, but involves the manner in which the shims are used in the establishment of the authentications and key generation links to the server.

Turning to FIG. 2, which provides background for the description of the invention illustrated in FIGS. 3–6, the client authentication software 20 is situated above the boundary of the transport or TDI layer 21 and is designed to utilize a socket 22, such as Winsock, to carry out communications with the authentication server 23 shown in FIG. 6 by means of a transport protocol such as TCP/IP, UDP, or the like, which in turn supply datagrams or packets to a hardware driver layer 24, such as NDIS 3.0, of a network or modem connection 25.

In operation, the client authentication software 20 intercepts interconnect calls 26 form client authentication software supported applications 27 and, if the calls are directed to the authentication server 23, or to a server 28 situated on a secured network whose access is controlled by the authentication server, establishes a secured communications link to the server by executing appropriate function calls 29 to the socket library, which in turn transmits function calls 30 to the TDI layer, causing the TDI layer to form datagrams or packets 31. Datagrams or packets 31 are then formatted over packaged for transmission by the hardware drivers 24 and sent to the communications network in the form of Ethernet packets or analog signals 32 containing the original datagrams from the TDI layer. Once the secured communications link has been established, client authentication software 20 encrypts all further data communications 34 from applications 27, which are indicated by dashed lines, before handing them off to the next lower layer in the form of encrypted files 35. The dashed lines are shown in FIG. 2 as extending only to the TDI layer 21, because the datagrams formed by the TDI layer are indistinguishable as to content, but it is to be understood that datagrams or packets 31 carry both the communications used to establish the secure channel, and the encrypted files subsequently sent therethrough.

Finally, in the case of SmartGATE™, the authentication client software utilizes either a smart card or secured file to supply the secret keys used during authentication to generate a session key for encryption of further communications, and also to carry out certain other encryption and authentication functions, although it is of course within the scope of the invention to use key distribution and authentication methods which do not rely on smartcards or tokens, and the tokens are not involved in any of the basic communications functions of the client authentication software 20.

In addition to the applications 27 which communicate with the server via the authentication/encryption software 20, a typical system will have a number of additional software applications 36 and 37 capable of carrying out communications over the open network, but which the authentication client software is not configured to handle, and which are not specifically adapted or intended to carry out communications with the authentication server. These are referred to herein as peer-to-peer applications, and can include applications which use the same sockets as the authentication client software, applications which directly call upon a transport driver interface stack, whether using the same protocol as the authentication client software or another protocol, all of which are intended to be represented by the TDI layer, and applications which are written to call directly upon the hardware drivers. These peer-to-peer applications may have their own encryption and authentication capabilities, but cannot utilize the services of the authentication server or client software, and therefore the function calls made by the applications and the files transmitted are indicated by separate reference numerals 40–43.

It will be appreciated by those skilled in the art that lower layer application programs which generate packets in forms other than those represented by the TDI layer are also possible, and should be considered within the scope of the invention, but at present virtually all open network applications use at least one of the TDI protocols, and thus while these programs may interact directly with the network driver layer, and require a network driver layer shim, as will be discussed below, are illustrated for purposes of convenience as part of the TDI layer applications.

Figure 3:
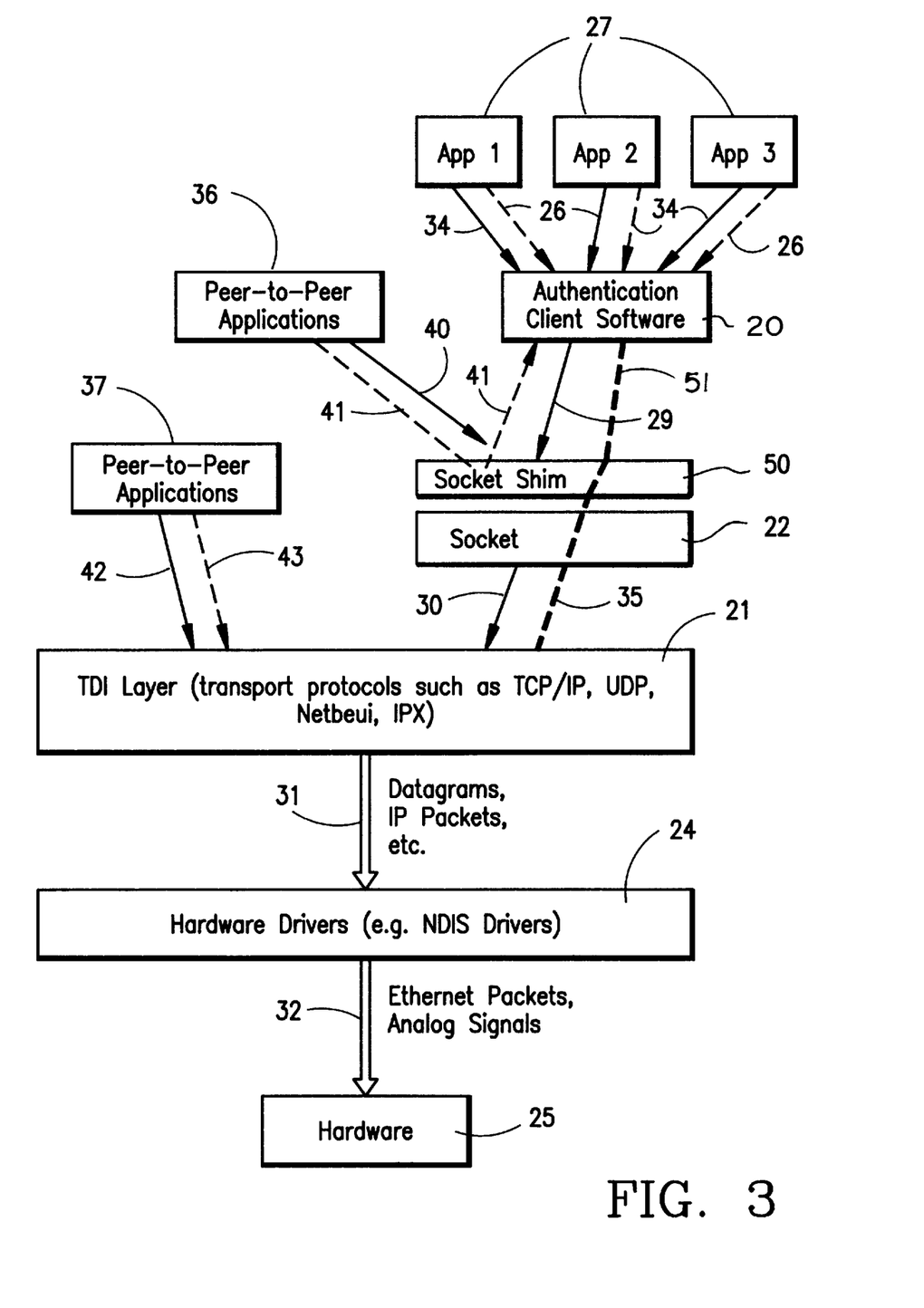
FIG. 3 is a functional block diagram showing the communications network hierarchy of FIG. 1, modified to provide a second layer of service in accordance with the principles of a preferred embodiment of the invention.

Turning now to a preferred embodiment of the invention, the arrangement shown in FIG. 3 modifies the arrangement of FIG. 2 by adding a socket shim 50 between the socket 22 utilized by the authentication client software 20, the peer-to-peer applications 36 which also utilize the socket 20, and the authentication client software itself. The shim 50 operates by hooking or intercepting call initiation function calls 40 made to the socket and, in response thereto, having the authentication client software initiate communications with the authentication server 23, shown in FIG. 6, in order to carry out the authentication protocol, as will be discussed in more detail below. Shim 50 also causes files 41 intended for the TDI layer to be diverted to the authentication software for encryption based on the session keys generated during the initial communications with the authentication server, and transmission as encrypted files 51 addressed to the peer application, also shown in FIG. 6, which could also be an application on the application server 28.

Since the basic authentication client software is designed to send all communications directly to the authentication server, while the peer-to-peer applications are designed only to communicate with "peers" 45 and not with the authentication server, the principal function of shim 50 is to arrange for the destination of address of the communication to be supplied to both the authentication client software and to authentication server, even though the peer application assumes that it is communicating only with the peer application. This function permits session key encrypted communications to be forwarded directly to the peer application, as illustrated in FIG. 6, while the latter function provides the authentication server with the client address so that the authentication server can establish a secured and authenticated link with the peer application, via authentication client software on the peer computer, and transmit the session key to the peer application or at least enable the peer application to recreate the session so that it can decrypt the encrypted files received directly from the client application.

Thus, while it is appreciated that the use of socket shims is well-known, as mentioned above, the socket shim shown in FIG. 2 has the unique function of enabling direct peer-to-peer communications with mediation by the authentication server, permitting the highest level of authentication service and collateral functions. In addition, because of the mediation by the key server, the peer applications do not need to have a shared secret key, allowing centralized key management, with only the authentication server having access to all of the client's secret keys.

FIG. 4 shows the variation of the client authentication software 20 in which a TDI shim 52 similar in function to the socket shim 50 is provided above the TDI layer. Like the socket shim, implementation of the TDI shim essentially simply involves diverting certain information to the client software in order to establish a communications link with the authentication server, and subsequently perform encryption to obtain encrypted files 54 for transmission directly through the TDI layer in the usual manner. As with the socket shim, TDI shims are not new and can be implemented in known manner, by intercepting TDI service requests, but with the difference from prior TDI shims that the TDI shim works with the authentication software 20 and authentication server to authenticate communications and generate a session key.

Finally, as shown in FIG. 5, a further layer of authentication and encryption may be added by adding a network driver shim 55, either to the arrangement shown in FIG. 3 without the TDI shim, in combination with the TDI shim shown in FIG. 4, or in combination with the TDI shim of FIG. 4 but not the socket shim, to provide for authentication of communications at the network driver layer. At this layer, the shim 55 intercepts IP packets from applications 56, but instead of referring back to the applications level routine, checks the destination address (which can be in TCP format, UDP format, and so forth), establishes a session key by communications with the authentication server, converts the session key into a format which can be used to encrypt the IP packet, and sends the IP packet towards the destination, all by carrying out the necessary operations at the network driver level, in a manner similar to that utilized by the above-mentioned SnareNet software program, but with the difference that the authenticating communications link and key generation is carried out by packets addressed to a corresponding layer 56 of the authentication server, which may be further connected to an applications server 57.

It will be noted that since the IP packets are not distinguishable by content, the network driver layer shim could be used as an additional level of security, rather than as an alternative to applications level encryption, with the encrypted files generated by software 20 being further encrypted by shim 55 before transmission to the authentication server or associated gateway.

The overall system utilizing the authentication client software illustrated in FIGS. 3–5 is schematically illustrated in FIG. 6. The principal components of the overall system are the client computers containing software of the type illustrated in FIGS. 2–5, including client authentication software 20 and shims 50, 53, and/or 55, and applications with communications capabilities (represented by applications 27, 36, 37, and 56 on one client, and application 45 on the other). For purposes of illustration, the client of FIG. 6 is thus depicted as including applications for communicating at the highest levels, such as the SmartGATE™ proxy application, applications for communicating at the network driver level with corresponding applications connected to the lower layer of the authentication server, and peer-to-peer applications with no capability of communicating with SmartGATE™, but which use sockets or TDI protocols recognized by the shims.

In the case of the SmartGATE™ proxy application, communications are established in the same manner as in the currently available version of the SmartGATE™ authentication client software, and as described in U.S. Pat. No. 5,602,918, the communications link being indicated by arrows 60 and 61, with arrow 60 representing the client/server response channel used to authenticate the parties and generate the session key.

In the case of a peer-to-peer application, in which the clients wish to communicate over a direct link 62, the invention provides for the function calls establishing the communications to be intercepted and the initialization procedure routed through channel 61 to the authentication server 23. Server 23 then opens a secured channel 63 to the authentication client software 20 associated with peer application 45 by performing the same mutual authentication procedure performed for the purpose of establishing channel 63, and once the channel is established with its own session key, transmits information using the channel 63 session key which allows the client to recreate the channel 60 session key for use in decrypting communications sent over channel 62. Alternatively, after establishing channel 63, the channel 60 session key could be used to transmit back to the original sending party information necessary to recreate the channel 63 session key. In either case, the authentication server is thus used to establish a fully authenticated "tunnel" between the peer applications without the need to modify any of the sockets, TDI protocols, or hardware drivers on either of the client computers. While the transmitting peer application has no way of directly authenticating the receiving peer, only a receiving peer authenticated by the authentication server will be able to generate the necessary session keys, and thus each of the parties to the communication is effectively authenticated.

For the lower layer application 56, a similar protocol may be employed, in which the attempted communication between lower layer applications is intercepted, and the communications link to the authentication server is used to generate a session key, which is then used to encrypt the packets or datagrams being sent. In this case, the destination must be the lower layer of the authentication server, and thus the communications link is indicated by a separate channel 67.

Figure 7:
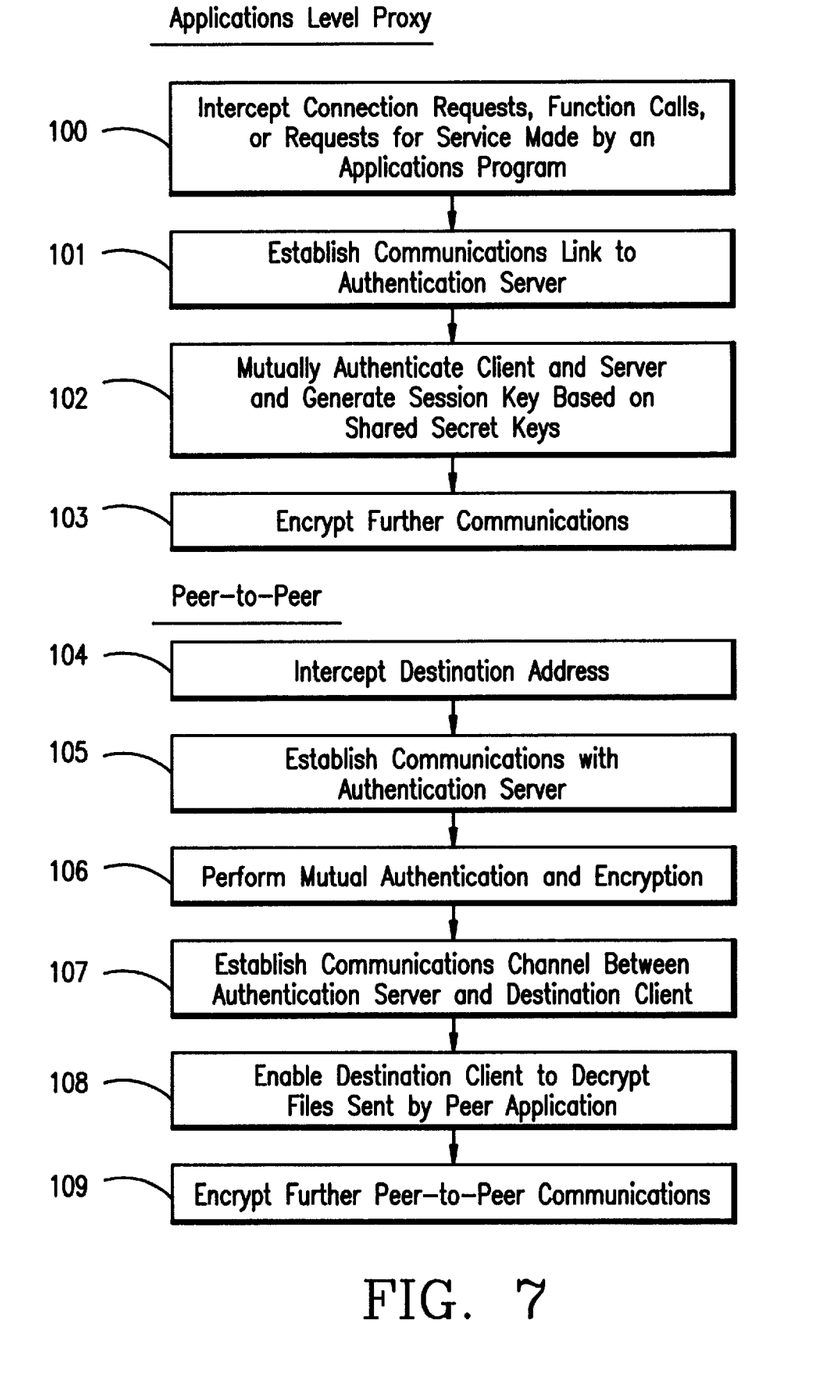
FIG. 7 is a flowchart illustrating a method of implementing the system of the preferred embodiment.

Finally, the procedures associated with the network illustrated in FIG. 6 are summarized in the flowchart of FIG. 7. For communications directly with the applications level portion of the server 23, steps 100–103 are used, while for peer-to-peer communications, steps 104–109 are used, and for network driver level communications, steps 110–114 are used.

In particular, step 100 by which the applications level authentication program 20 illustrated in FIGS. 3–5 receives a call initiation request, either directly from a supported applications program 27 or from a programs 36 and 37 via one of the shims 50 and 53, step 101 is step by which the program 20 addresses the authentication server, step 102 is the step by which the client and server are mutually authenticated and the session keys generated using, for example, the procedure described in U.S. Pat. No. 5,602,918, and step 103 is the step by which program 20 encrypts further communications received directly or via shims 50 and 53 from the applications programs 27, 36, and 37.

For peer-to-peer communications, step 105, which is part of step 100, is the step by which the peer address is supplied to program 20, steps 106 and 107 are identical to steps 101 and 102, step 108 is the step by which communications channel 63 shown in FIG. 6 is established, step 109 is the step by which the destination computer authenticated by the server is enabled to decrypt communications received over channel 62, and step 110 is the step by which program 20 encrypts the communications. It will of course be appreciated that these steps represent only a summary of the steps involved in carrying out the present invention, and that further steps will be apparent to those skilled in the art based on the above description of the apparatus and software portions of the preferred embodiment of the invention.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

What is claimed is:

1. Apparatus for carrying out communications over a multi-tier virtual private network, said network including a server and a plurality of client computers, the server and client computers each including means for transmitting data to and receiving data from an open network, comprising:

means for intercepting function calls and requests for service sent by an applications program on one of said client computers to a lower level set of communications drivers;

means for causing an applications level authentication and encryption program in said one of said client computers to communicate with the server, generate a session key, and use the session key generated by the applications level authentication and encryption program to encrypt files sent by the applications program before transmittal over said open network, and means for intercepting files packaged by a transport driver interface layer to form packets and encrypting the packets using a session key generated during communications between corresponding lower layers of the server and said one of said client computers.

2. Apparatus for carrying out communications over a multi-tier virtual private network, said network including a server and a plurality of client computers, the server and client computers each including means for transmitting data to and receiving data from an open network, comprising:

means for intercepting function calls and requests for service sent by an applications program on one of said client computers to a lower level set of communications drivers; and means for causing an applications level authentication and encryption program in said one of said client computers to communicate with the server, generate a session key, and use the session key generated by the applications level authentication and encryption program to encrypt files sent by the applications program before transmittal over said open network, and further comprising means for intercepting a destination address during initialization of communications between said one of said client computers and a second of said client computers on said virtual private network;

means for causing said applications level authentication and encryption program to communicate with the server to in order to enable the applications level authentication and encryption program to generate said session key;

means for transmitting said destination address to said server;

means for causing said server to communicate with the second of said two client computers;

means for enabling said second of said two client computers to recreate the session key;

means for causing said authentication software to encrypt files to be sent to the destination address using the session key; and means for transmitting the encrypted files directly to the destination address.

3. Apparatus as claimed in claim 2, wherein said means for intercepting the destination address is carried out by a shim positioned between a peer-to-peer applications program and a layer of a communications driver architecture of said one of the two client computers.

4. A multi-tier virtual private network, comprising:

a server and a plurality of client computers, the server and client computers each including means for transmitting data to and receiving data from an open network, wherein said means for transmitting data to and receiving data from the open network includes, in any client computer initiating communications with the server:

applications level encryption and authentication software arranged to communicate with the server in order to: a.) mutually authenticate the server and the client computer initiating communications with the server and b.) generate a session key for use by the client computer initiating communications to encrypt files;

at least one lower level set of communications drivers;

and a shim arranged to intercept function calls and requests for service sent by an applications program to the lower level set of communications drivers in order to cause the applications level authentication and encryption program to communicate with the server, generate said session key, and encrypt files sent by the applications program before transmittal over said open network, wherein said lower level set of communications drivers includes a network driver layer, a transport driver interface layer arranged to package applications files as packets capable of being routed over the open network and supply the packets to the network driver layer for transmission to the open network, and an applications socket for facilitating service requests by said applications program to the transport driver interface layer, and wherein said shim is a socket shim positioned between the applications program and the socket to intercept function calls to the socket in order to cause the applications level authentication and encryption program to communicate with the server, generate said session key, and encrypt files sent by the applications program before the files are packaged by the transport driver interface layer, and wherein said applications program is a peer-to-peer communications program, wherein a peer application destination address, included in said function calls to the socket, is diverted by the socket shim, and wherein a destination address including said intercepted function calls is supplied to the server during communications with the server, causing the service to establish a communications link with a peer application, mutually authenticate the peer application, and enable the peer application to reconstruct the session key in order to receive encrypted files sent by the peer-to-peer communications program over the open network.

5. A multi-tier virtual private network, comprising:

a server and a plurality of client computers, the server and client computers each including means for transmitting data to and receiving data from an open network, wherein said means for transmitting data to and receiving data from the open network includes, in any client computer initiating communications with the server:

applications level encryption and authentication software arranged to communicate with the server in order to: a.) mutually authenticate the server and the client computer initiating communications with the server and b.) generate a session key for use by the client computer initiating communications to encrypt files;

at least one lower level set of communications drivers;

and a shim arranged to intercept function calls and requests for service sent by an applications program to the lower level set of communications drivers in order to cause the applications level authentication and encryption program to communicate with the server, generate said session key, and encrypt files sent by the applications program before transmittal over said open network, wherein said lower level set of communications drivers includes a network driver layer, a transport driver interface layer arranged to package applications files as packets capable of being routed over the open network and supply the packets to the network driver layer for transmission to the open network, and an applications socket for facilitating service requests by said applications program to the transport driver interface layer, and wherein said shim is a socket shim positioned between the applications program and the socket to intercept function calls to the socket in order to cause the applications level authentication and encryption program to communicate with the server, generate said session key, and encrypt files sent by the applications program before the files are packaged by the transport driver interface layer, and further including a transport driver interface shim positioned between the transport driver interface layer and a second applications program, for intercepting requests from the second applications program for service by the transport driver interface layer in order to cause the applications level authentication and encryption program to communicate with the server, generate said session key, and encrypt files sent by the applications program before the files are packaged by the transport driver interface layer.

6. A multi-tier virtual private network as claimed in claim 5, further comprising a network driver layer shim positioned between the network driver layer and the transport driver interface layer and arranged to intercept files packaged by the transport driver interface layer and encrypt the files using a session key generated during communications with a lower layer of the server.

7. A multi-tier virtual private network, comprising:

a server and a plurality of client computers, the server and client computers each including means for transmitting data to and receiving data from an open network, wherein said means for transmitting data to and receiving data from the open network includes, in an client computer initiating communications with the server:

applications level encryption and authentication software arranged to communicate with the server in order to: a.) mutually authenticate the server and the client computer initiating communications with the server and b.) generate a session key for use by the client computer initiating communications to encrypt files;

at least one lower level set of communications drivers; and a shim arranged to intercept function calls and requests for service sent by an applications program to the lower level set of communications drivers in order to cause the applications level authentication and encryption program to communicate with the server, generate said session key, and encrypt files sent by the applications program before transmittal over said open network, and wherein said lower level set of communications drivers includes a network driver layer, and a transport driver interface layer arranged to package applications files as packets capable of being routed over the open network and supply the packets to the network driver layer for transmission to the open network, and wherein said shim is a transport driver interface layer shim positioned between the applications program and the transport driver interface layer to intercept service requests by the applications program to the transport driver interface layer in order to cause the applications level authentication and encryption program to communicate with the server, generate said session key, and encrypt files sent by the applications program before the files are packaged by the transport driver interface layer.

8. A multi-tier virtual private network as claimed in claim 7, wherein said applications program is a peer-to-peer communications program, and wherein a peer application destination address, included in said intercepted requests for service, is diverted by the transport driver interface layer shim and supplied to the server during communications with the server, causing the service to establish a communications link with a peer application, mutually authenticate the peer application, and enable the peer application to reconstruct the session key in order to receive encrypted files sent by the peer-to-peer communications program over the open network.

9. A multi-tier virtual private network as claimed in claim 7, further comprising a network driver layer shim positioned between the network driver layer and the transport driver interface layer and arranged to intercept files packaged by the transport driver interface layer and encrypt the files using a session key generated during communications with a lower layer of the server.

10. A multi-tier virtual private network, comprising:

a server and a plurality of client computers, the server and client computers each including means for transmitting data to and receiving data from an open network, wherein said means for transmitting data to and receiving data from the open network includes, in any client computer initiating communications with the server:

applications level encryption and authentication software arranged to communicate with the server in order to: a.) mutually authenticate the server and the client computer initiating communications with the server and b.) generate a session key for use by the client computer initiating communications to encrypt files; and at least one lower level set of communications drivers, wherein said lower level set of communications drivers includes a network driver layer, a transport driver interface layer arranged to package applications files as packets capable of being routed over the open network and supply the packets to the network driver layer for transmission to the open network, and a network driver layer shim positioned between the transport driver interface layer and the network driver layer and arranged to intercept files packaged by the transport driver interface layer and encrypt the files using a session key generated during communications with a lower layer of the server.

11. A multi-tier virtual private network, comprising:

a server and a plurality of client computers, the server and client computers each including means for transmitting data to and receiving data from an open network, wherein said means for transmitting data to and receiving data from the open network includes, in any client computer initiating communications with the server:

applications level encryption and authentication software arranged to communicate with the server in order to: a.) mutually authenticate the server and the client computer initiating communications with the server and b.) generate a session key for use by the client computer initiating communications to encrypt files; and further comprising means for securing peer-to-peer communications between applications on two of said client computers, said peer-to-peer communications securing means comprising:

means for intercepting a destination address during initialization of communications by a first of said two client computers;

means for causing said authentication software to communicate with the server to carry out functions a.) and b.);

means for transmitting said destination address to said server;

means for causing said server to carry-out functions a.) and b.) with respect to the second of said two client computers;

means for enabling said second of said two client computers to recreate the session key;

means for causing said authentication software to encrypt files to be sent to the destination address using the session key;

means for transmitting the encrypted files directly to the destination address.

12. A multi-tier virtual private network as claimed in claim 11, wherein said means for intercepting the destination address comprises a shim positioned between the peer-to-peer applications program and a layer of a communications driver architecture of said first of the two client computers.

13. A multi-tier virtual private network as claimed in claim 11, wherein said shim is positioned above a socket, the socket being positioned above a transport driver layer of said communications driver architecture.

14. A multi-tier virtual private network as claimed in claim 11, wherein said shim is positioned above a transport driver layer of said communications driver architecture.

15. Computer software for installation on a client computer of a multi-tier virtual private network, said network including a server and a plurality of client computers, the server and client computers each including means for transmitting data to and receiving data from an open network, wherein said computer software includes:

applications level encryption and authentication software arranged to communicate with the server in order to: a.) mutually authenticate the server and the client computer initiating communications with the server and b.) generate a session key for use by the client computer initiating communications to encrypt files;

and a shim arranged to intercept function calls and requests for service sent by an applications program to a lower level set of communications drivers in order to cause the applications level authentication and encryption program to communicate with the server, generate said session key, and encrypt files sent by the applications program before transmittal over said open network, wherein said lower level set of communications drivers includes a network driver layer, a transport driver interface layer arranged to package applications files as packets capable of being routed over the open network and supply the packets to the network driver layer for transmission to the open network, and an applications socket for facilitating service requests by said applications program to the transport driver interface layer, and wherein said shim is a socket shim positioned between the applications program and the socket to intercept function calls to the socket in order to cause the applications level authentication and encryption program to communicate with the server, generate said session key, and encrypt files sent by the applications program before the files are packaged by the transport driver interface layer, and wherein said applications program is a peer-to-peer communications program, wherein a peer application destination address, included in said function calls to the socket, is diverted by the socket shim, and wherein a destination address including said intercepted function calls is supplied to the server during communications with the server, causing the service to establish a communications link with a peer application, mutually authenticate the peer application, and enable the peer application to reconstruct the session key in order to receive encrypted files sent by the peer-to-peer communications program over the open network.

16. Computer software for installation on a client computer of a multi-tier virtual private network, said network including a server and a plurality of client computers, the server and client computers each including means for transmitting data to and receiving data from an open network, wherein said computer software includes:

applications level encryption and authentication software arranged to communicate with the server in order to: a.) mutually authenticate the server and the client computer initiating communications with the server and b.) generate a session key for use by the client computer initiating communications to encrypt files;

and a shim arranged to intercept function calls and requests for service sent by an applications program to a lower level set of communications drivers in order to cause the applications level authentication and encryption program to communicate with the server, generate said session key, and encrypt files sent by the applications program before transmittal over said open network, wherein said lower level set of communications drivers includes a network driver layer, a transport driver interface layer arranged to package applications files as packets capable of being routed over the open network and supply the packets to the network driver layer for transmission to the open network, and an applications socket for facilitating service requests by said applications program to the transport driver interface layer, and wherein said shim is a socket shim positioned between the applications program and the socket to intercept function calls to the socket in order to cause the applications level authentication and encryption program to communicate with the server, generate said session key, and encrypt files sent by the applications program before the files are packaged by the transport driver interface layer, and further including a transport driver interface shim positioned between the transport driver interface layer and a second applications program, for intercepting requests from the second applications program for service by the transport driver interface layer in order to cause the applications level authentication and encryption program to communicate with the server, generate said session key, and encrypt files sent by the applications program before the files are packaged by the transport driver interface layer.

17. Computer software as claimed in claim 16, further comprising a network driver layer shim positioned between the network driver layer and the transport driver interface layer and arranged to intercept files packaged by the transport driver interface layer and encrypt the files using a session key generated during communications with a lower layer of the server.

18. Computer software for installation on a client computer of a multi-tier virtual private network, said network including a server and a plurality of client computers, the server and client computers each including means for transmitting data to and receiving data from an open network, wherein said computer software includes:

applications level encryption and authentication software arranged to communicate with the server in order to: a.) mutually authenticate the server and the client computer initiating communications with the server and b.) generate a session key for use by the client computer initiating communications to encrypt files;

and a shim arranged to intercept function calls and requests for service sent by an applications program to a lower level set of communications drivers in order to cause the applications level authentication and encryption program to communicate with the server, generate said session key, and encrypt files sent by the applications program before transmittal over said open network, and wherein said lower level set of communications drivers includes a network driver layer, and a transport driver interface layer arranged to package applications files as packets capable of being routed over the open network and supply the packets to the network driver layer for transmission to the open network, and wherein said shim is a transport driver interface layer shim positioned between the applications program and the transport driver interface layer to intercept service requests by the applications program to the transport driver interface layer in order to cause the applications level authentication and encryption program to communicate with the server, generate said session key, and encrypt files sent by the applications program before the files are packaged by the transport driver interface layer.

19. Computer software as claimed in claim 18, wherein said applications program is a peer-to-peer communications program, and wherein a peer application destination address, included in said intercepted requests for service, is diverted by the transport driver interface layer shim and supplied to the server during communications with the server, causing the service to establish a communications link with a peer application, mutually authenticate the peer application, and enable the peer application to reconstruct the session key in order to receive encrypted files sent by the peer-to-peer communications program over the open network.

20. Computer software as claimed in claim 18, further comprising a network driver layer shim positioned between the network driver layer and the transport driver interface layer and arranged to intercept files packaged by the transport driver interface layer and encrypt the files using a session key generated during communications with a lower layer of the server.

21. Computer software for installation on a client computer of a multi-tier virtual private network, said network including a server and a plurality of client computers, the server and client computers each including means for transmitting data to and receiving data from an open network, wherein said computer software includes:
    applications level encryption and authentication software arranged to communicate with the server in order to: a.) mutually authenticate the server and the client computer initiating communications with the server and b.) generate a session key for use by the client computer initiating communications to encrypt files; and
    at least one lower level set of communications drivers, wherein said lower level set of communications drivers includes a network driver layer, a transport driver interface layer arranged to package applications files as packets capable of being routed over the open network and supply the packets to the network driver layer for transmission to the open network, and a network driver layer shim positioned between the transport driver interface layer and the network driver layer and arranged to intercept files packaged by the transport driver interface layer and encrypt the files using a session key generated during communications with a lower layer of the server.

22. Computer software for installation on a client computer of a multi-tier virtual private network, said network including a server and a plurality of client computers, the server and client computers each including means for transmitting data to and receiving data from an open network, wherein said computer software includes:
    applications level encryption and authentication software arranged to communicate with the server in order to: a.) mutually authenticate the server and the client computer initiating communications with the server and b.) generate a session key for use by the client computer initiating communications to encrypt files; and
    further comprising means for securing peer-to-peer communications between applications on two of said client computers, said peer-to-peer communications securing means comprising:
        means for intercepting a destination address during initialization of communications by a first of said two client computers;
        means for causing said authentication software to communicate with the server to carry out functions a.) and b.);
        means for transmitting said destination address to said server;
        means for causing said server to carry-out functions a.) and b.) with respect to the second of said two client computers;
        means for enabling said second of said two client computers to recreate the session key;
        means for causing said authentication software to encrypt files to be sent to the destination address using the session key;
        means for transmitting the encrypted files directly to the destination address.

23. Computer software as claimed in claim 22, wherein said means for intercepting the destination address comprises a shim positioned between the peer-to-peer applications program and a layer of a communications driver architecture of said first of the two client computers.

24. Computer software as claimed in claim 22, wherein said shim is positioned above a socket, the socket being positioned above a transport driver layer of said communications driver architecture.

25. Computer software as claimed in claim 22, wherein said shim is positioned above a transport driver layer of said communications driver architecture.

26. A method of carrying out communications over a multi-tier virtual private network, said network including a server and a plurality of client computers, the server and client computers each including means for transmitting data to and receiving data from an open network, comprising the steps of:
    intercepting function calls and requests for service sent by an applications program in one of said client computers to a lower level set of communications drivers;
    causing an applications level authentication and encryption program in said one of said client computers to communicate with the server, generate a session key, and use the session key generated by the applications level authentication and encryption program to encrypt files sent by the applications program before transmittal over said open network; and
    intercepting files packaged by a transport driver interface layer to form packets and encrypting the packets using a session key generated during communications between a lower layer of the server and a lower layer of said one of said client computers.

27. A method of carrying out communications over a multi-tier virtual private network, said network including a server and a plurality of client computers, the server and client computers each including means for transmitting data to and receiving data from an open network, comprising the steps of:
    intercepting function calls and requests for service sent by an applications program in one of said client computers to a lower level set of communications drivers;
    causing an applications level authentication and encryption program said one of said client computers to communicate with the server, generate a session key, and use the session key generated by the applications level authentication and encryption program to encrypt files sent by the applications program before transmittal over said open network;
    intercepting a destination address during initialization of communications between said one of said client computers and a second of said client computers on said virtual private network;

causing said applications level authentication and encryption program to communicate with the server in order to enable the applications level authentication and encryption program to generate said session key;

transmitting said destination address to said server;

causing said server to communicate with the second of said two client computers;

enabling said second of said two client computers to recreate the session key;

causing said authentication software to encrypt files to be sent to the destination address using the session key; and transmitting the encrypted files directly to the destination address.

28. A method as claimed in claim 27, wherein said step of intercepting the destination address is carried out by a shim positioned between a peer-to-peer applications program and a layer of a communications driver architecture of said one of the two client computers.

* * * * *